United States Patent [19]

Shimoi

[11] 4,326,286
[45] Apr. 20, 1982

[54] AUTOMATIC RECORDER PLAYER

[75] Inventor: Mamoru Shimoi, Tenri, Japan

[73] Assignee: Sanyo Electric Co., Ltd., Moriguchi, Japan

[21] Appl. No.: 135,468

[22] Filed: Mar. 31, 1980

[30] Foreign Application Priority Data

Apr. 5, 1979 [JP] Japan .................................. 54-41755
May 18, 1979 [JP] Japan .................................. 54-61882

[51] Int. Cl.³ .............................................. G11B 17/06
[52] U.S. Cl. ..................................... 369/226; 369/216; 369/243
[58] Field of Search ................ 369/225, 226, 227, 228, 369/215, 203, 216, 217, 184, 185, 186, 187, 188, 202, 204, 206, 243

[56] References Cited

U.S. PATENT DOCUMENTS

| 2,764,415 | 9/1956 | Carlson | 369/188 |
| 3,023,009 | 2/1962 | Dale | 369/185 |
| 3,506,270 | 4/1970 | Rankin | 369/243 |
| 3,822,889 | 7/1974 | Nakagawa | 369/243 |
| 3,847,401 | 11/1974 | Evans | 369/206 |
| 3,885,798 | 5/1975 | Yokokura | 369/226 |

FOREIGN PATENT DOCUMENTS 922981 4/1963 United Kingdom .

Primary Examiner—John W. Shepperd
Attorney, Agent, or Firm—Darby & Darby

[57] ABSTRACT

An automatic record player comprises a tone arm, a drive motor, a turntable, a turntable spindle having a turntable gear, a gear wheel engageable with the turntable gear to receive a rotational force of the turntable, a tripping member for bringing the turntable gear into engagement with the gear wheel, a cam arrangement defined on the gear wheel, a drive transmitting lever having one end engaged to the cam arrangement and the other end operatively coupled to the tone arm, and a switching lever for selecting cam portions of the cam arrangement into use one at a time. The cam arrangement is comprised of a generally heart-shaped cam groove and a bypass groove bypassing a portion of the heart-shaped cam groove and having a depth larger than that of the heart-shaped cam groove. An automatic power switch control and a start-cut mechanism are also utilized.

8 Claims, 10 Drawing Figures

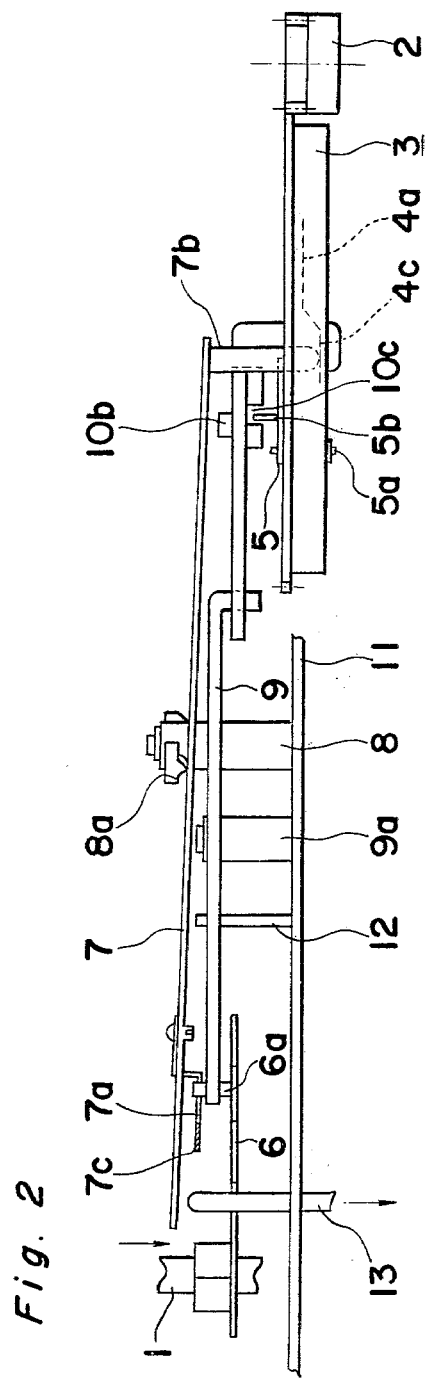
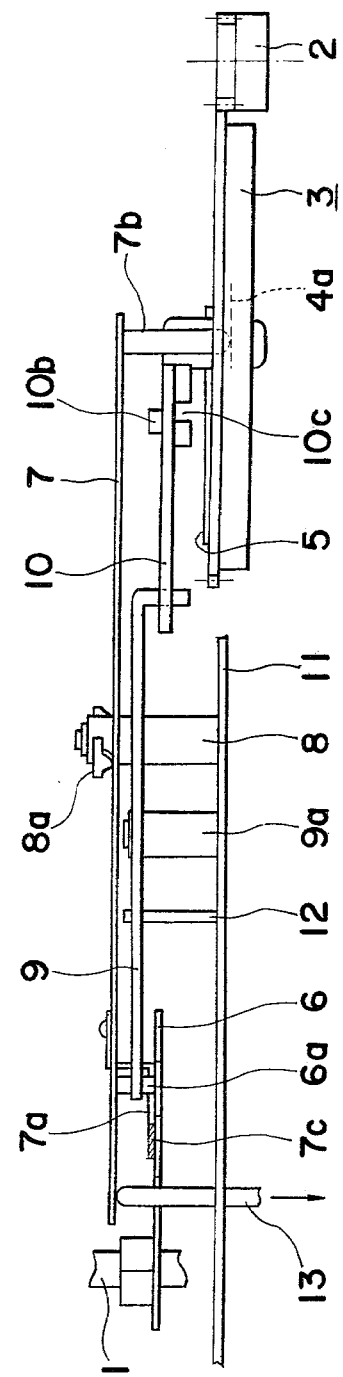
Fig. 2
Fig. 4

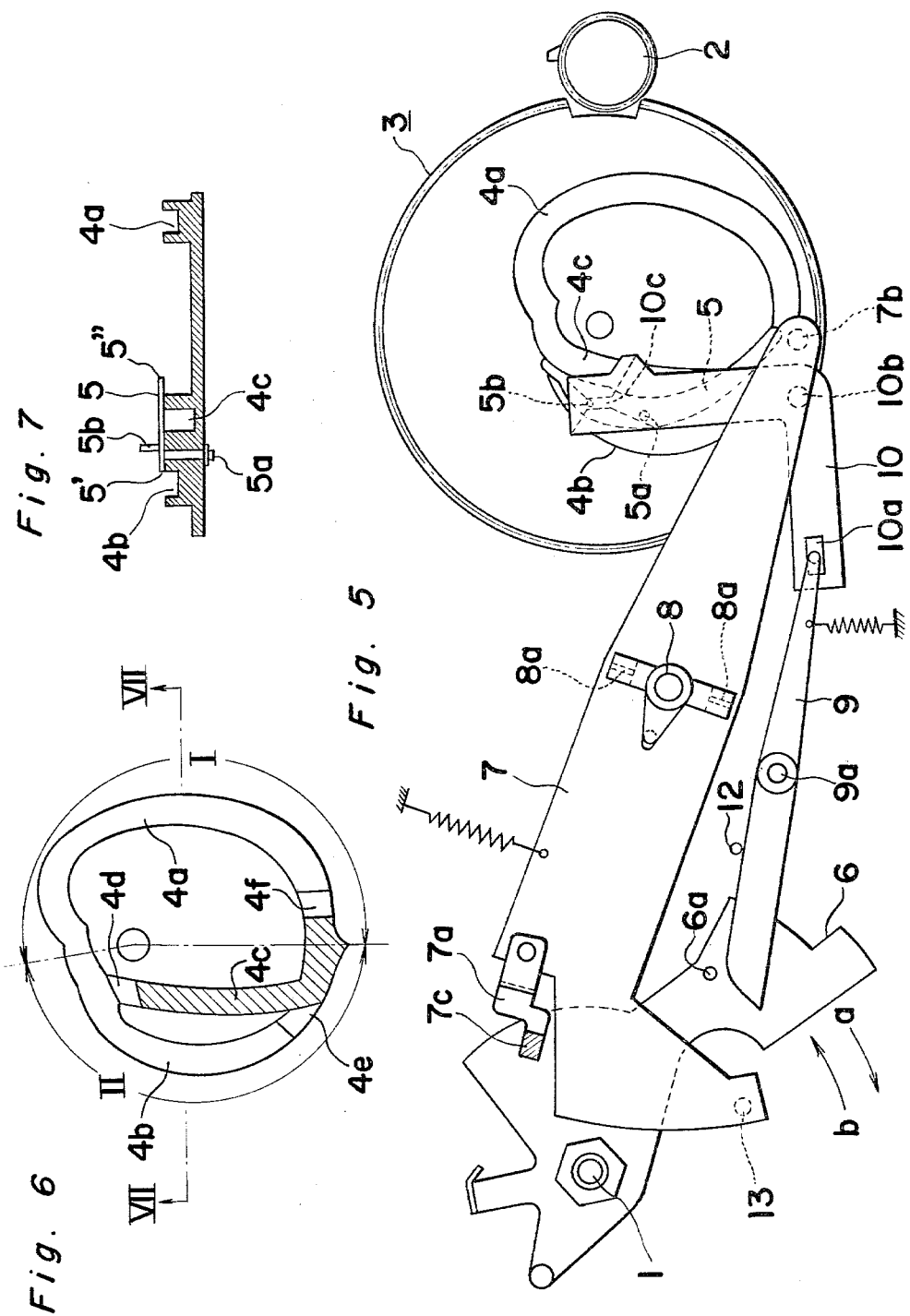

AUTOMATIC RECORDER PLAYER

BACKGROUND OF THE INVENTION

The present invention generally relates to an automatic record player.

There is known an automatic record player which comprises a turntable spindle having a geared hub coaxial therewith and a drive gear wheel having a cam groove rigidly mounted thereon for rotation together with the drive gear wheel, the geared hub and the drive gear wheel being so operatively associated with each other that, when the drive gear wheel and the geared hub are brought into engagement with each other in response to the manipulation of the start-cut knob to the "Start" position or the engagement of the pick-up stylus into the lead-out or runout groove of the record resting on the turntable, the cam groove being rotated together with the drive gear wheel causes the tone arm to undergo a lead-in movement from the arm rest towards a position immediately above the lead-in groove of the record on the turntable or a lead-out movement from a position immediately above the lead-out groove of the record on the turntable back towards the arm rest, respectively. Where the cam groove on the drive gear wheel is comprised of two cam patterns one for use in effecting the lead-in movement of the tone arm and the other for use in effecting the lead-out movement of the tone arm, it is necessary to make use of a switching lever operable in two different modes for selectively bringing the cam patterns into operable position one at a time.

SUMMARY OF THE INVENTION

The present invention has for its essential object to provide an improved automatic record player wherein the switching lever is automatically brought into the operative modes selectively one at a time so that the lead-in and lead-out movements of the tone arm can assuredly and effectively be performed.

Another important object of the present invention is to provide an improved automatic record player wherein a single start-cut knob is employed to initiate the lead-in and lead-out movements of the tone arm one at a time.

A further object of the present invention is to provide an improved automatic record player wherein a power control switch electrically connected in series with a drive motor is utilized, which power control switch is held in an on state to energize the drive motor during the lead-in and lead-out movements of the tone arm and subsequent to the operation of the record player.

BRIEF DESCRIPTION OF THE DRAWINGS

These and other objects and features of the present invention will become apparent from the following description taken in conjunction with a preferred embodiment thereof with reference to the accompanying drawings, in which:

FIG. 2 is a side sectional view of the automatic record player shown in FIG. 1;

FIG. 4 is a view similar to FIG. 2, with the record player held in the operative position shown in FIG. 3;

FIG. 5 is a view similar to FIG. 1, showing the record player in another operative position during which the record is performed;

FIG. 6 is a bottom plan view of a portion of the drive gear wheel, showing the details of a cam arrangement;

FIG. 7 is a cross sectional view taken along the line VII—VII in FIG. 6;

DETAILED DESCRIPTION OF THE INVENTION

Figure 1:
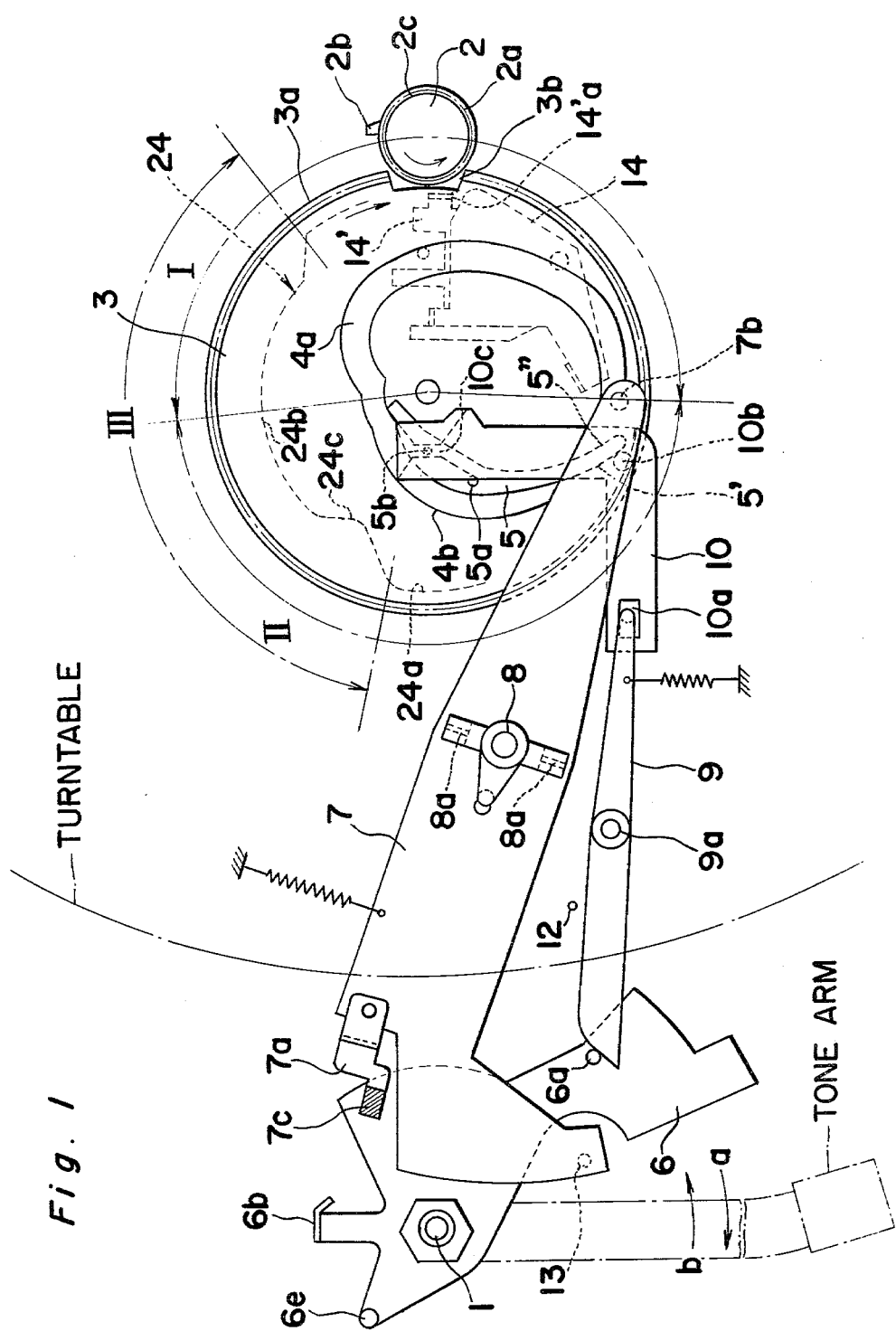
FIG. 1 is a bottom plan view of an automatic record player embodying the present invention, the record player being shown in an inoperative position.
Figure 3:
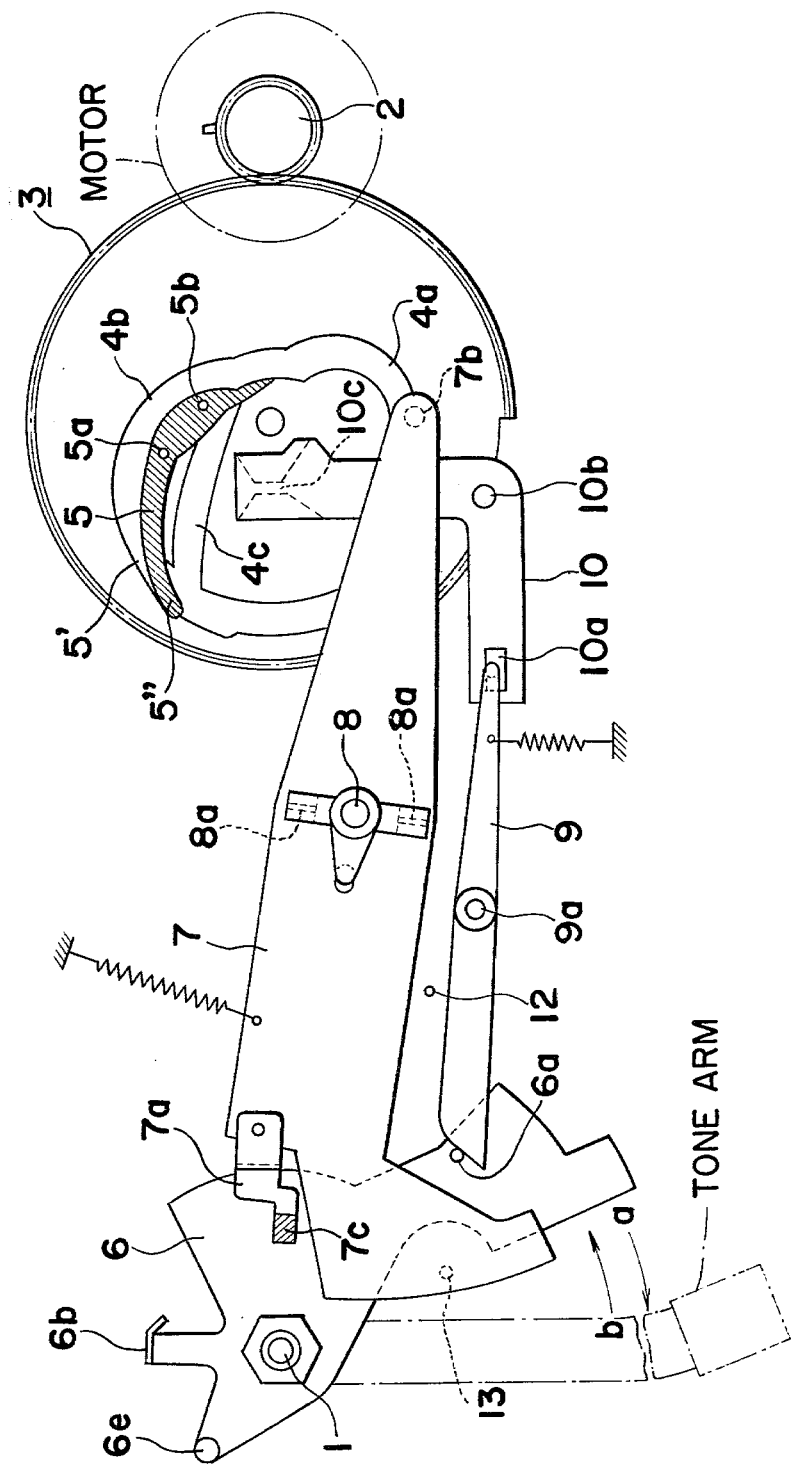
FIG. 3 is a view similar to FIG. 1, showing the record player in an operative position subsequent to the start of rotation of a drive gear wheel.

Before the description of the present invention proceeds, it is to be noted that like parts are designated by like reference numerals throughout the several views of the accompanying drawings.

Figure 8:
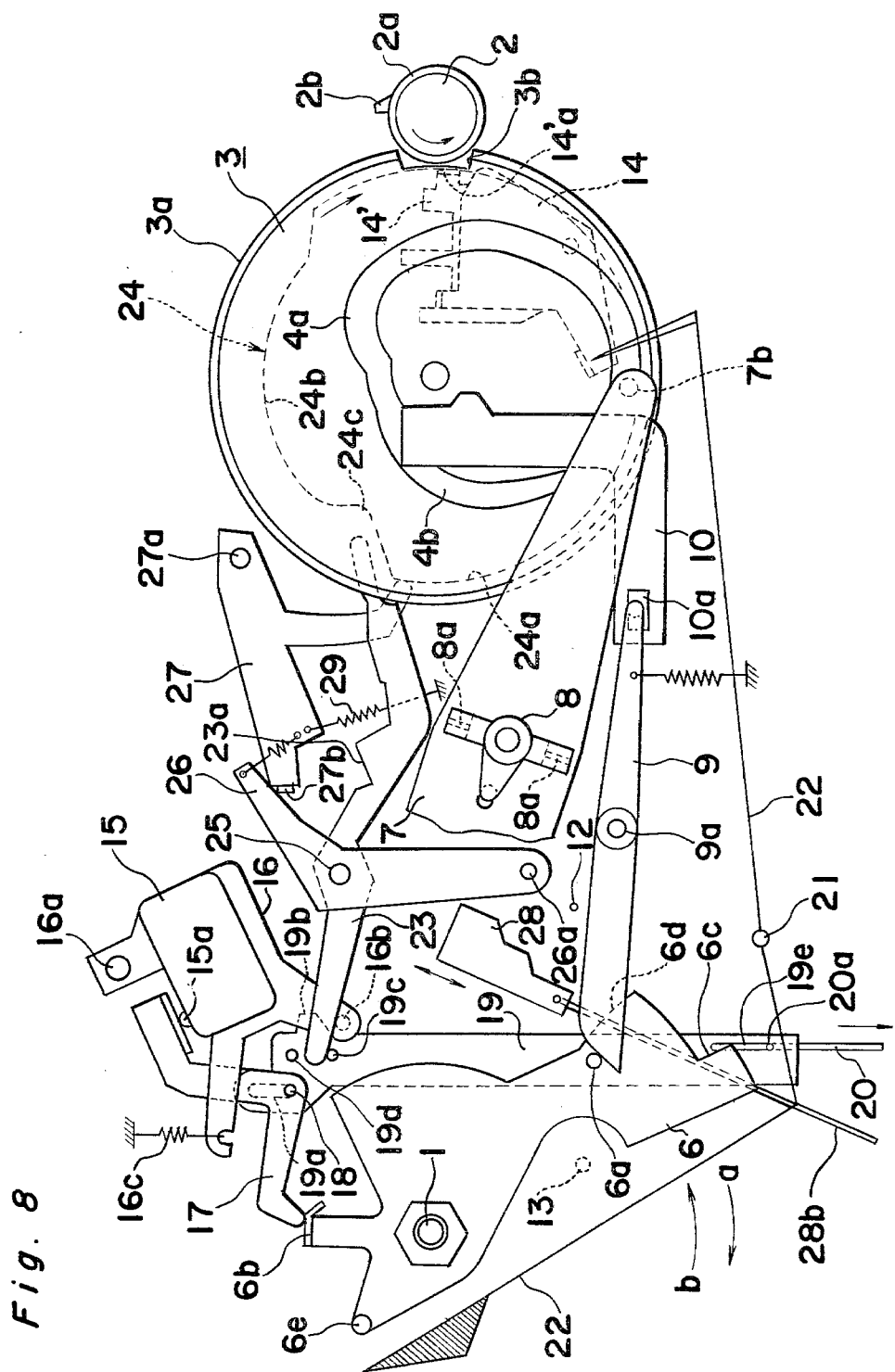
FIG. 8 is a view similar to FIG. 1, showing the record player in the inoperative position immediately prior to operation.

Referring first to FIGS. 1 and 2, the automatic record player embodying the present invention comprises a tone arm (not shown) rigidly mounted on a tone arm spindle 1 having its upper end fast with the tone arm and positioned downwardly as viewed in FIG. 2 and its lower end supported by, and connected to, a tone arm swinging plate 6 for rotation together therewith, and a turntable spindle 2 having a center hub 2c coaxial with the turntable and rigidly connected thereto for rotation together therewith. The center includes a pinion gear 2a formed integrally therewith and a drive lug portion 2b protruding radially outwardly therefrom beyond the periphery of the teeth of the pinion gear 2a. Positioned adjacent to and in side-by-side relation to the center hub 2 fast with the spindle 2 is a drive wheel 3 having its periphery formed with gear teeth 3a, engageable with the pinion gear 2a, and a toothless cutout 3b. It is to be noted that, when and so long as the tone arm is held in a rest position resting on a tone arm rest (not shown), the drive wheel 3 assumes such a position as shown in FIGS. 1 and 8 with the toothless cutout 3b receiving therein the pinion gear 2a without being engaged thereto.

The drive wheel 3 has one of its opposed surfaces formed with a generally heart-shaped cam groove 4, the details of which are best shown in FIGS. 6 and 7. Referring now to FIGS. 6 and 7, the generally heart-shaped cam groove 4 is comprised of two arcuate groove sections 4a and 4b, the groove section 4a being used during the lead-out movement of the tone arm and the groove section 4b being used during the lead-in movement of the tone arm. Also defined on said one of the opposed surfaces of the drive wheel 3 is a bypass groove 4c of a depth larger than the depth of the generally heart-shaped cam groove 4. This bypass groove 4c has one end continued to one end portion of the groove section 4b through a slope 4d and the other end continued to the other end portion of the groove section 4b, said bypass groove 4c extending in a manner bypassing the groove section 4b. It is to be noted that the other end portion of the groove section 4b and the adjacent end portion of the groove section 4a, which are located on respective sides of the second mentioned end of the bypass groove 4c, are formed into respective slopes 4e and 4f. This bypass groove 4c is provided for the purpose of preventing the tone arm, which has completed its lead-out movement, from being moved to an operative position with the pick-up stylus (not shown) engaged in the groove of the record on the turntable, the function of which will be described later.

The drive wheel 3 carries an upright pin 5a for the support of a switching lever 5 pivotable about the upright pin 5a and provided for bringing the groove section 4b and the bypass groove 4c selectively into use, said switching lever 5 carrying a guide pin 5b rigidly mounted thereon.

Rotation of the drive wheel 3 can be transmitted to the tone arm swinging plate 6 fast with the tone arm spindle 1. For this purpose, there is provided a drive transmitting lever 7 having one end provided rigidly with a carrier 7a, which carries a frictional element 7c engageable under friction with the swinging plate 6, and the other end carrying a follower pin 7b slidingly engaged in the cam groove 4. This drive transmitting lever 7 is supported at a substantially intermediate portion thereof by a support column 8 for rotation about the longitudinal axis of the support column 8 and also for pivotal movement in a plane perpendicular to the plane of the lever 7 about fulcrums provided for by rollers 8a which are positioned on respective sides of the support column 8 in a direction perpendicular to the longitudinal extent of the lever 7. It is to be noted that the drive transmitting lever 7 is normally biased by a spring element (not shown) in such a manner with the substantially intermediate portion thereof contacting the rollers 8a while the follower pin 7b is constantly engaged in the cam groove 4.

For selectively positioning the switching lever 5, that is, for selectively engaging the follower pin 7b into the groove section 4b and the bypass groove 4c one at a time, depending on and by the detection of the position of the tone arm and, hence, the swinging plate 6, series-connected first and second detecting levers 9 and 10 are utilized. The first detecting lever 9 is pivotally supported at a substantially intermediate portion thereof by a spindle 9a rigidly mounted on a chassis 11 and has one end engageable with a pin 6a rigidly mounted on the swinging plate 6 and the other end loosely engaged in a generally rectangular slot 10a defined in the second detecting lever 10. The second detecting lever 10 being of a generally L-shaped configuration is pivotally supported at its bent portion by a spindle 10b rigidly mounted on the chassis 11 and has one end loosely connected to the first detecting lever 9 in the manner described above and the other end having a generally X-shaped cam groove 10c (best shown in FIG. 3) defined thereon, said X-shaped cam groove 10c receiving therein the guide pin 5b fast with the switching lever 5. The pivotal movement of the first detecting lever 9 in a direction clockwise about the spindle 9a as viewed in FIGS. 1, 3, 5 and 8 is restricted by a stopper pin 12 fast with the chassis 11.

Reference numeral 13 represents a tone arm lift rod which, when moved in a direction shown by the arrow in FIG. 2, moves the tone arm upwardly in a direction away from the plane of the record resting on the turntable.

The drive wheel 3 also carries first and second tripping members 14 and 14' pivotally mounted on the other of the opposed surfaces thereof in overlapping relation to each other. The tripping member 14' has a pawl 14'a formed integrally therewith and is operable in such a manner that, either when the pick-up stylus comes to be engaged in the lead-out or runout groove of the record on the turntable being then rotated in one direction, or when a manipulatable start-cut knob (not shown) is manipulated, the tripping member 14' is pivoted with the pawl 14'a brought into the path of movement of the drive lug portion 2b fast with the center hub 2 in readiness for the engagement therewith. Upon engagement of the drive lug portion 2b with the pawl 14'a of the tripping member 14', the pinion gear 2a on the center hub 2 is brought into engagement with the gear teeth 3a, thereby causing the drive wheel 3 to rotate in harmony with the center hub 2 in one direction clockwise as viewed in FIGS. 1, 3, 5, 8, 9 and 10. At the time of completion of one revolution of the center hub 2, the first tripping member 14 is operable to return the second tripping member 14' back to the original position with the pawl 14'a brought in position clear of the path of movement of the drive lug portion 2b in contact with the periphery of the pinion gear 2a. These tripping members 14 and 14' and their operation are well known to those skilled in the art and disclosed in, for example, the U.S. Pat. No. 4,023,813 and reference may be had to said patent for the details thereof.

Hereinafter, a power control switch 15 and its associated mechanism will be described with particular reference to FIGS. 8 to 10.

Figure 9:
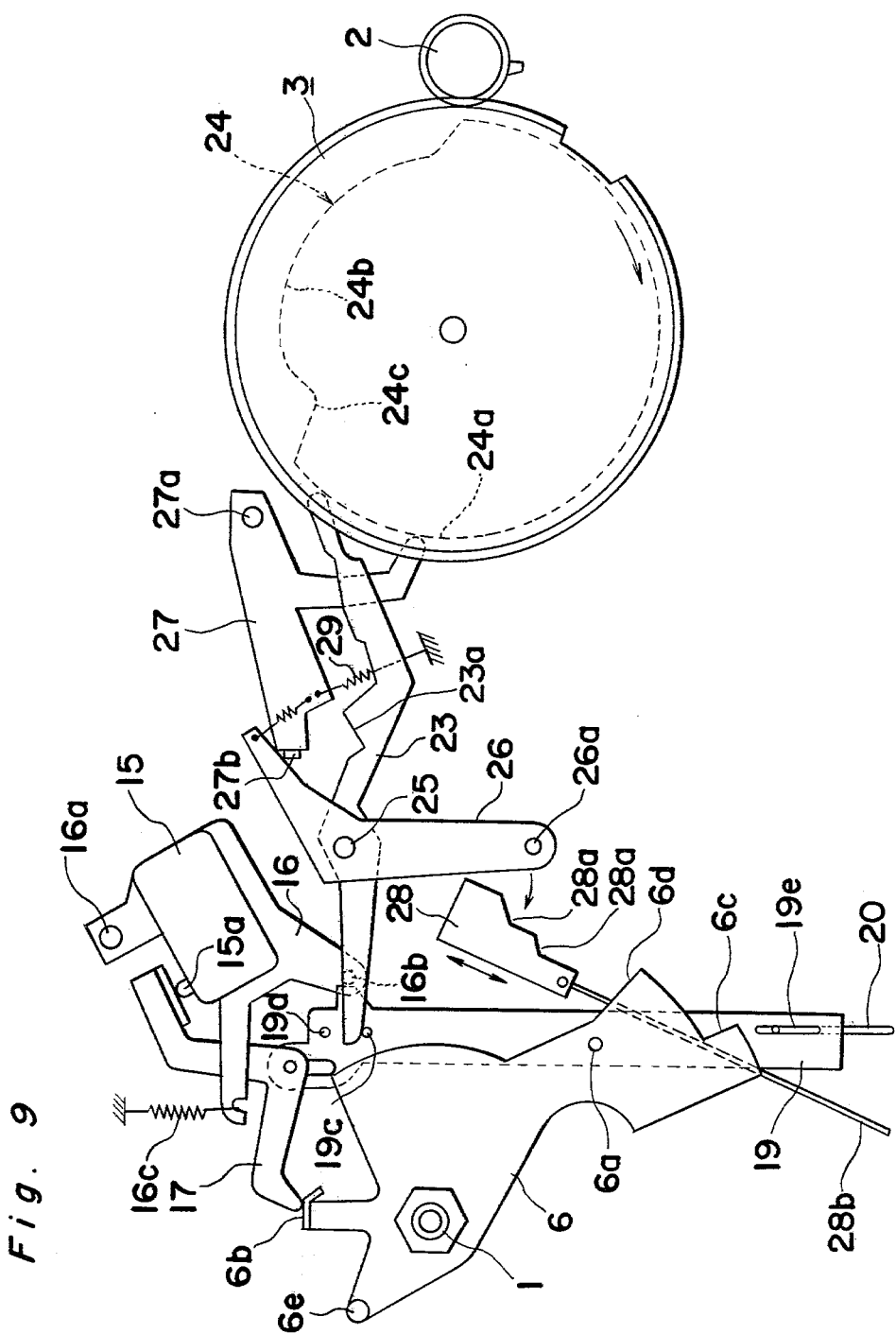
FIG. 9 is a view similar to FIG. 3, showing the record player in the operative position.
Figure 10:
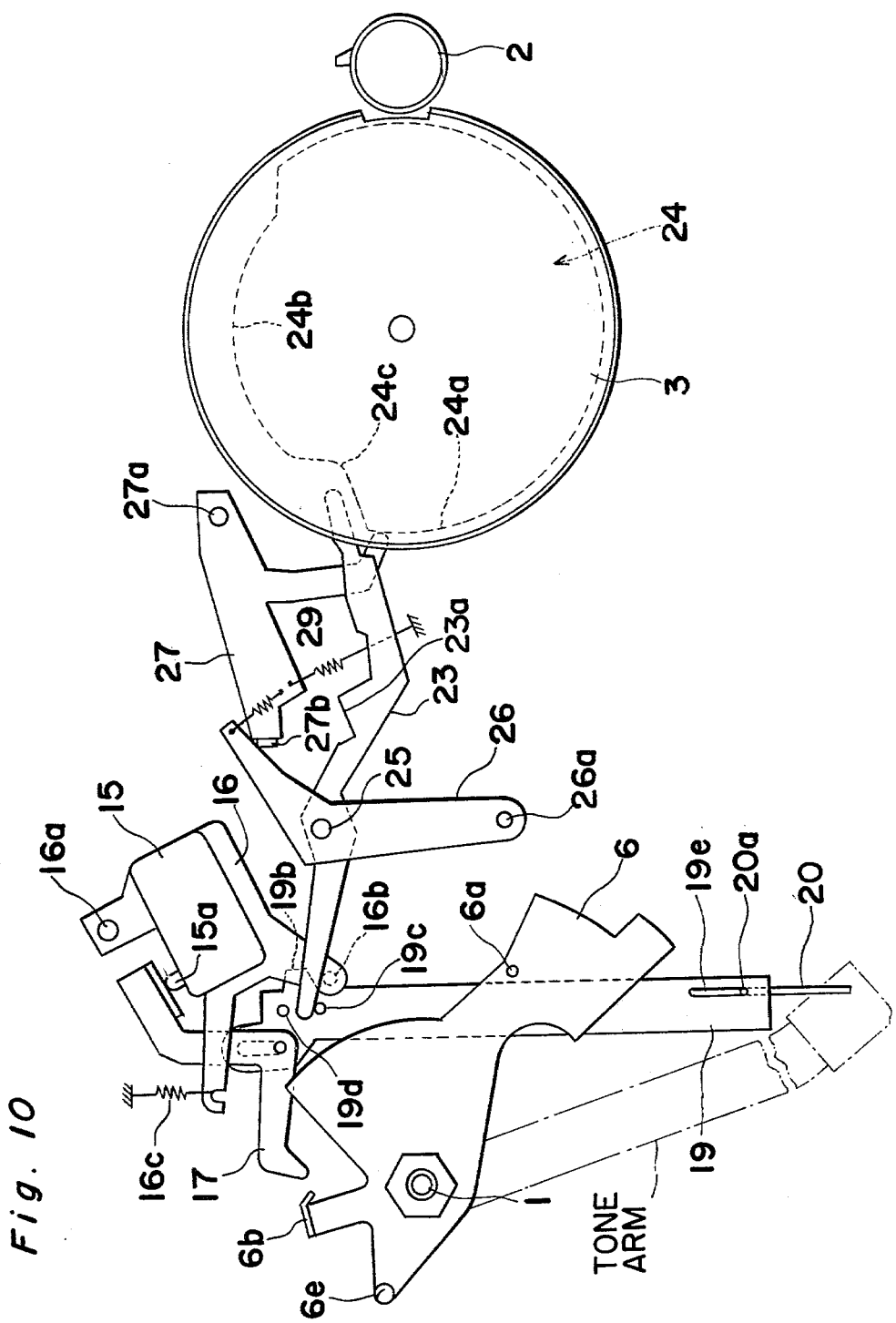
FIG. 10 is a view similar to FIG. 1, showing the record player in the operative position after a prior operation.

Referring to FIGS. 8 to 10, the power control switch 15 being of a type normally closed is used to control the supply of an electric power to a drive motor (not shown) for driving the turntable in one direction and is rigidly mounted on a pivotable switch carrier plate 16 pivotally supported by a pin 16a and normally biased clockwise about the pin 16a by a tension spring 16c. This switch 15 has a collapsible, but normally outwardly projecting, actuator 15a which, when the tone arm is held in the rest position, is inwardly depressed, as shown in FIG. 8, in contact with a switch control lever 17 with the switch 15 consequently opened to interrupt the supply of the electric power to the drive motor. More specifically, the switch control lever 17 is of a generally L-shaped configuration and is pivotally supported at its bent portion by a pin 18. This switch control lever 17 has one end operable to depress the actuator 15a of the switch 15 in a manner as shown in FIG. 8 when the other end of the switch control lever 17 is engaged to a finger 6b integrally formed with the swinging plate 6. The engagement of the other end of the switch control lever 17 with the finger 6b integral with the swinging plate 6 takes place when and so long as the tone arm is held in the rest position, and the switch 15 is therefore opened at this time by the reason described above.

An operating lever 19 has one end formed with a guide slot 19a through which the pin 18 extends and the other end coupled to the start-cut knob by means of a wire 20, one end of said wire 20 adjacent to the operating lever 19 being bent at 20a to protrude through a slot 19e defined in the operating lever 19. This operating lever 19 can move in a direction away from the control lever 17, while guided by the pin 18 engaged in the guide slot 19a, when the wire 20 is pulled in a direction shown by the arrow in FIG. 8 incident to the manipulation of the start-cut knob. This operating lever 19 also has a lateral cam projection 19b formed integrally therewith, the cam projection 19b being so shaped and so operatively associated with a boss 16b rigidly mounted on the carrier plate 16 that, when the operating lever 19 is moved in the direction away from the control lever 17 incident to the manipulation of the start-cut knob, the boss 16b fast with the carrier plate 16 slides over the cam projection 19b thereby pivoting the carrier plate 16 counterclockwise about the pin 16a against the tension spring 16c as shown in FIG. 9. This counterclockwise pivot of the carrier plate 16 against the tension spring 16c while the end of the control lever 17 adjacent the swinging plate 6 is still in engagement with the finger 6b as shown in FIG. 9 causes the actuator 15a of the switch 15 to move away from the control lever 17 while projecting outwardly from the switch 15, the consequence of which is the closure of the switch 15 to supply the electric power to the drive motor.

At the same time, as the start-cut knob is manipulated with the wire 20 pulled in the direction shown by the arrow in FIG. 8, the bent end 20a of the wire 20 comes into engagement with a trigger lever 22 thereby causing the latter to pivot counterclockwise about the point 21 of pivot, the consequence of which is that one end of the trigger lever 22 adjacent the tripping members 14 and 14' pushes the tripping members 14 and 14' so as to rotate them clockwise to bring the pawl 14'a integral with the tripping member 14' into the path of movement of the drive lug portion 2b fast with the center hub 2c. Therefore, it will readily be seen that, when the start-cut knob is manipulated in the manner as hereinbefore described, not only is the switch 15 closed to drive the drive motor, but the drive lug portion 2b is engaged to the pawl 14'a integral with the tripping member 14' to enable the pinion gear 2a to be engaged to the gear teeth 3a, thereby effecting the lead-in or lead-out movement of the tone arm.

It is to be noted that, when the start-cut knob is manipulated in an attempt to effect the lead-out movement of the tone arm while the record on the turntable is being played, the switch 15 remains closed on one hand and the pinion gear 2a is brought into engagement with the gear teeth 3a on the other hand in a manner as will become clear from the subsequent description.

The operation of the automatic record player of the construction so far described will now be described.

FIGS. 1 and 8 illustrate the condition of the automatic record player wherein the tone arm is held in the rest position resting on the tone arm rest and the switch 15 is opened. In this condition, the end of the first detecting lever 9 opposite to the second detecting lever 10 is engaged to the pin 6a on the swinging plate 6 in the manner as shown while the guide pin 5b on the switching lever 5 is engaged in the generally X-shaped cam groove 10c defined on the second detecting lever 10. In this condition, even when the drive wheel 3 is rotated in the direction as shown by the arrow, no movement of the switching lever 5 take place, but the switching lever 5 is held in position to bring the cam groove section 4b into use, that is, to guide the follower pin 7b fast with the drive transmitting lever 7 into the cam groove section 4b. Subsequent manipulation of the start-cut knob results in the closure of the switch 15, in the manner as hereinbefore described, thereby causing the spindle 2 to rotate in one direction and also the drive wheel 3 to rotate in the direction shown by the arrow in FIGS. 1 and 8.

FIG. 9 illustrates the condition of the automatic record player which is established shortly after the player has been started, that is, both the speindle 2 and the drive wheel 3 have been rotated through a certain angle. In this condition, the operating lever 19 is locked in the position as shown in FIG. 9 by a lock lever 23 and, therefore, the switch 15 is held in the closed position even when and after the application of an external pushing force applied to the start-cut knob so as to pull the operating lever 19 in the direction away from the control lever 17 has been interrupted. This is possible because of the particular shape of a cam body 24 formed integrally with the drive wheel 3. The cam body 24 integral with the drive wheel 3 is comprised of outermost, intermediate and innermost cam faces 24a, 24b and 24c which are consecutive to each other, the outermost cam face 24a being positioned radially inwardly of and nearest to the peripheral edge of the drive wheel 3, followed by the intermediate cam face 24b and then by the innermost cam face 24c furtherest from the peripheral edge of the drive wheel 3. With the cam body 24 constructed in the manner described above, shortly after the drive wheel 3 has been rotated with the gear teeth 3a held in engagement with the pinion gear 2a subsequent to the manipulation of the start-cut knob in the manner described above, one end of the lock lever 23 adjacent the drive wheel 3 and remote from the operating lever 19 slides over a slope from the innermost cam face 24c onto the outermost cam face 24a, pivoting counterclockwise about a support pin 25 on which said lock lever 23 is pivotally mounted. When the lock lever 23 is so pivoted counterclockwise, the other end of the lock lever 23 adjacent the operating lever 19 abuts against a stop pin 19c rigid on the operating lever 19, thereby holding the operating lever 19 in the locked position as moved a distance away from the control lever 17 as hereinbefore described with the switch 15 consequently closed.

During the continued rotation of the drive wheel 3 in one direction shown by the arrow, the follower pin 7b on the drive transmitting lever 7 which has been engaged in the bypass groove 4c is brought into engagement with the groove section 4a having a depth smaller than that of the bypass groove 4c. As the follower pin 7b is engaged into the groove section 4a from the bypass groove 4c, the transmitting lever 7 undergoes a seesaw motion pivoting counterclockwise, as viewed in FIG. 2, about the rollers 8a with the friction element 7c consequently brought into contact with the swinging plate 6. Simultaneously therewith, as shown in FIG. 4, the end of the transmitting lever 7 adjacent the tone arm lift rod 13 causes the tone arm lift rod 13 to move in the direction shown by the arrow with the tone arm consequently upwardly lifted from the tone arm rest.

It is to be noted that, during the rotation of the drive wheel 3 while the follower pin 7b on the transmitting lever 7 is relatively guided in a region of the cam groove 4 which is shown by I in FIG. 6 and includes the cam groove section 4a, the transmitting lever 7 is rotated counterclockwise about the support column 8. Although because of the contact of the friction element 7c carried by the transmitting lever 7 to the swinging plate 6, the swinging plate 6 tends to be pivoted in a direction shown by the arrow a, that is, in a direction parallel to the direction in which the tone arm undergoes the lead-out movement, the fact is that no pivotal movement of the swinging plate 6 in the direction of the arrow a take place, but the frinction element 7c moves idle in frictional contact with the swinging plate 6 because the tone arm is then retained in the rest position.

However, as soon as the follower pin 7b is subsequently brought into engagement with a region of the cam groove 4 shown by II in FIG. 6, the follower pin 7b is guided into the groove section 4b by the switching lever 5, and the transmitting lever 7 is consequently rotated clockwise about the support column 8 with the friction element 7c contacting the swinging plate 6. This clockwise rotation of the transmitting lever 7 about the support column 8 causes the swinging plate 6 to move in a direction shown by the arrow b in contact with the friction element 7c, and, therefore, the tone arm which has been upwardly shifted starts its lead-in movement from the position above the tone arm rest towards the operative position above the lead-in groove of the record on the turntable. It is to be noted that the extent to which the tone arm moves during the lead-in movement is determined by an engagement pin 26a rigid on a record size selector lever 26 which is cooperative with, and is engageable to, any one of detent steps defined on a record size setting slide 28. Therefore, depending on the position of any one of the detent steps in the setting slide 28 to which the engagement pin 26a on the selector lever 26 is engaged, the tone arm can be moved to such an extent as to enable the pick-up stylus to be positioned immediately above the lead-in groove of the record of a particular size without being excessively moved beyond the lead-in groove of the record. Once one of the steps 6c and 6d in the swinging plate 6 is engaged to the engagement pin 26a then engaged to a selected one of the detent steps in the setting slide 28, the friction element 7c carried by the transmitting lever 7 then continued to rotate clockwise about the support column 8 with the follower pin 7b guided along the groove section 4b moves slipping on the swinging plate 6 without moving the latter.

In other words, when the drive wheel 3 is rotated to such an extent as to enable one arm of a generally V-shaped pivotable lever 27, pivotally supported by a pin 27a, to be engaged to the leading side of the intermediate cam face 24b within a region shown by III in FIG. 1 with respect to the direction of rotation of the drive wheel 3, the pivotable lever 27 is pivoted counterclockwise about the pin 27a and, in response to the counterclockwise rotation of the pivotable lever 27 about the pin 27a, the selector lever 26 is pivoted clockwise about the support pin 25 with the engagement pin 26a consequently engaged to a selected one of the detent steps 28a in the setting slide 28. These detent steps 28a in the setting slide 28 can be selected one at a time according to the size of a record to be played and, for this purpose, by moving the setting slide 28 in either one of the opposed directions shown by the arrows by the manipulation of a record size selector knob (not shown) coupled thereto by means of a connecting rod 28b, one of the detent steps 28a to which the engagement pin 26a on the selector lever 26 should be engaged in view of the record of a particular size can be selected. It is to be noted that the angular distance through which the tone arm and, therefore, the swinging plate 6, should rotate to bring the pick-up stylus from the position immediately above the tone arm rest towards the operative position immediately above the lead-in groove of the record then placed on the turntable is determined by the engagement of one of steps 6c and 6d defined in the swinging plate 6 to the engagement pin 26a then received in the selected one of the detent steps 28a in the setting slide 28.

When the tone arm starts its lead-in movement towards the operative position immediately above the lead-in groove of the record on the turntable together with the swinging plate 6 pivoting in the direction shown by the arrow b, the pin 6a on the swinging plate 6 is disengaged from the end of the first detecting lever 9, causing the latter to pivot clockwise about the spindle 9a under the influence of a biasing force of a spring. This clockwise rotation of the first detecting lever 9 about the spindle 9a is accompanied by the counterclockwise rotation of the second detecting lever 10 about the pin 10b so that the second detecting lever 10 assumes such a position as shown in FIG. 5. Accordingly, shortly before the completion of one revolution of the drive wheel 3, the guide pin 5b on the switching lever 5 is guided into the X-shaped cam groove 10c defined on the second detecting lever 10, and the switching lever 5 is consequently held in position to bring the bypass groove 4c into use, that is, to guide the follower pin 7b ready to enter the bypass groove 4c. The positioning of the switching lever 5 in the manner described above is facilitated by the subsequent engagement of the follower pin 7b to a side edge portion 5' of the switching lever 5.

During the further continued rotation of the drive wheel 3, when the follower pin 7b having been engaged in the groove section 4b is engaged into the bypass groove 4c through the slope 4e, the transmitting lever 7 undergoes a seesaw motion pivoting about the rollers 8a with the friction element 7c disengaging from the swinging plate 6. Simultaneously therewith, the tone arm lift rod 13 is moved in the direction opposite to the direction of the arrow shown in FIG. 2 and the tone arm then angularly moved to the operative position above the lead-in groove of the record descends with the pick-up stylus engaged in the lead-in groove of the record.

On the other hand, shortly before the completion of one revolution of the drive wheel 3, since the arm of the pivotable lever 27 and the end of the lock lever 23 fall into engagement with the innermost cam face 24c, the pivotable lever 27 is further pivoted counterclockwise about the pin 27a by the action of a spring 29 with its bent end 27b abutting against the recess 23a of the lock lever 23, thereby causing the lever 23 to pivot clockwise about the support pin 25. This clockwise rotation of the lock lever 23 about the support pin 25 results in the movement of the operating lever 19 in a direction close towards the control lever 17 with the end of the lock lever 23 contacting a stop pin 19d rigid on the operating lever 19. In this way, the operating lever 19 which has been held in the locked position as shown in FIG. 9 returns to the original position shown in FIGS. 1 and 8. It is to be noted that, as the operating lever 19 returns towards the original position as shown in FIGS. 1 and 8, the switch carrier plate 16 is pivoted clockwise about the pin 16a by the action of the spring 16c thereby returning to the original position as shown in FIGS. 1 and 8. Although the actuator 15a of the switch 15 on the carrier plate 16 is likely to be depressed by the control lever 17 upon arrival of the carrier plate 16 to the original position as shown in FIGS. 1 and 8, the control lever 17 is free to rotate about the pin 18 during the playing of the record, that is, after the swinging plate 6 has been pivoted in the direction of the arrow b together with the tone arm, and, therefore, the actuator 15a of the switch 15 is not depressed, that is, the switch 15 is not opened.

Upon completion of one revolution of the drive wheel 3, the drive wheel 3 is held in position with the toothless cutout 3b confronting and disengaged from the pinion gear 2a fast with the center hub 2 as shown in FIGS. 5 and 10. At this time, the arm of the pivotable lever 27 is again engaged to the outermost cam face 24a pivoting the pivotable lever 27 clockwise about the pin 27a against the spring 29. This clockwise rotation of the pivotable lever 27 with the arm thereof held in contact with the outermost cam face 24a causes the selector lever 26 to pivot counterclockwise about the spindle 25 with the engagement pin 26a disengaging from both one of the detent steps 28a in the setting slide 28 and one of the recesses 6c and 6d in the swinging plate 6. Accordingly, the swinging plate 6 and, therefore, the tone arm, is freely rotatable about the longitudinal axis of the spindle 1 to enable the record on the turntable to be played.

Either after the playing of the record finishes, or when the start-cut knob is manipulated during the period in which the record is being played, the engagement between the gear teeth 3a and the pinion gear 2a is again established. More specifically, when the playing of the record finishes an actuator pin 6e carried by the swinging plate 6 abuts against the trigger lever 22 (FIG. 8) to pivot the latter counterclockwise about the pin 21 thereby bringing the pawl 14'a of the tripping member 14' into the path of movement of the drive lug portion 2b in the manner as hereinbefore described. On the other hand, when the start-cut knob is manipulated during the playing of the record, the bent end 20a of the wire 20 is engaged to the trigger lever 22 to pivot the latter counterclockwise about the pin 21 thereby bringing the pawl 14'a of the tripping member 14' into the path of movement of the drive lug portion 2b in the manner as hereinbefore described. Accordingly, it is clear that the engagement between the gear teeth 3a and the pinion gear 2a takes place when the drive lug portion 2b abuts against the pawl 14'a in the manner as hereinbefore described.

It is also clear from the foregoing description that, subsequent to the start of the second rotation of the drive wheel 3, the swinging plate 6 is rotated in the direction of the arrow a in response to the rotation of the drive wheel 3 with the follower pin 7b slidingly engaged in the cam groove section 4a within the region I, thereby effecting the lead-out movement of the tone arm towards the rest position.

As soon as the tone arm returns to the position immediately above the tone arm rest, the finger 6b integral with the swinging plate 6 is at this time engaged to the end of the control lever 17 adjacent thereto, tending to cause the other end of the control lever 17 to depress the actuator 15a of the switch 15 on the carrier plate 16. However, since the end of the lock lever 23 remote from the operating lever 19 is slidingly engaged to the outermost cam face 24a in a manner as shown in FIG. 9, the operating lever 19 is held in the locked position as shown in FIG. 9. Accordingly, the switch 15 remains closed without the actuator 15a being depressed.

As the follower pin 7b approaches the portion of the cam groove 4 within the region II while the drive wheel 3 continues to rotate in the direction of the arrow, the follower pin 7b is guided into the bypass groove 4c by the switching lever 5. Since the bypass groove 4c has a depth larger than that of the cam groove 4, that is, that of any one of the groove sections 4a and 4b, the engagement of the follower pin 7b into the bypass groove 4c causes the transmitting lever 7 to undergo a seesaw motion pivoting about the rollers 8a, resulting in that not only is the friction element 7c disengaged from the swinging plate 6, but also the tone arm lift rod 13 is moved in the direction counter to the direction of the arrow shown in FIG. 2 with the tone arm consequently descending to rest on the tone arm rest.

Simultaneously with the return of the tone arm to the position immediately above the tone arm rest in the manner as hereinbefore described, the pin 6a rigid on the swinging plate 6 is brought into engagement with the first detecting lever 9 and, consequently, the first and second detecting levers 9 and 10 are again positioned in a manner as shown in FIG. 1. Accordingly, shortly before the completion of one revolution of the drive wheel 3, the guide pin 5b on the switching lever 5 is guided into the X-shaped cam groove 10c on the second detecting lever 10, thereby permitting the switching lever 5 to assume such a position as to bring the groove section 4b into use as shown in FIG. 1. The positioning of the switching lever 5 in the manner described above is facilitated by the subsequent engagement of the follower pin 7b to a side edge portion 5" of the switching lever 5.

As has readily be understood from the foregoing description, shortly before the completion of one revolution of the drive wheel 3 and when the lock lever 23 is pivoted clockwise about the support pin 25 to release the operating lever 19 from the locked position, the switch 15 is opened to interrupt the supply of the electric power to the drive motor. However, even though the drive motor is deenergized, the drive wheel 3 still continues to rotate under the influence of an inertia force of the turntable until it completes 360° rotation, that is, until the toothless cutout 3b is aligned with the center hub 2 without being engaged to the pinion gear 2a. By so doing, the movable parts of the automatic record player according to the present invention return to their original positions in readiness for the next cycle of operation of the record player.

From the foregoing description, it is also clear that the switch 15 is closed even when the tone arm resting on the tone arm rest is manually moved to the position immediately above the lead-in groove of the record on the turntable and that the switch 15 is opened even when the tone arm is manually moved back to the rest position during the playing of the record. More specifically, when the tone arm in the rest position is manually moved to the operative position, the finger 6b integral with the swinging plate 6 is disengaged from the control lever 17 thereby allowing the actuator 15a of the switch 15 to protrude outwardly to close the switch 15. Simultaneously therewith, the pin 6a on the swinging plate 6 is also disengaged from the first detecting lever 9 to allow the latter to pivot clockwise by the action of the spring, accompanying the counterclockwise rotation of the second detecting lever 10. This in turn results in the counterclockwise rotation of the switching lever 5 to assume the position as shown in FIG. 5. This is possible because the guide pin 5b on the switching lever 5 is engaged in the X-shaped cam groove 10c on the second detecting lever 10. By so doing, the switching lever 5 is brought into position to bring the bypass groove 4c into use for subsequently effecting the lead-out movement of the tone arm.

On the other hand, when the tone arm then playing the record is forcibly moved back towards the rest position, starting from the condition as shown in FIG. 5, the pin 6a on the swinging plate 6 abuts against the first detecting lever 9 and, therefore, the first and second detecting levers 9 and 10 are returned to the original positions as shown in FIG. 1 in the manner as hereinbefore described.

From the foregoing full description of the present invention, it is clear that the present invention involves numerous advantages. For example, the lead-in and lead-out movements of the tone arm to be effected can automatically be selected one at a time depending on the position of the tone arm relative to the record on the turntable. Therefore, the lead-in and lead-out movements of the tone arm can assuredly and effectively be performed.

Moreover, only by manipulating the start-cut knob, both of the lead-in and lead-out movements of the tone arm can be effected one at a time by the utilization of the cam groove on the drive wheel driven in synchronism with the turntable spindle. This renders the automatic record player not only to be simple in construction, but also to be easy to handle.

Furthermore, the use of the power control switch so designed as to be closed only during any one of the lead-in and lead-out movements of the tone arm and as to be opened when the drive wheel completes its 360° rotation subsequent to the return of the tone arm to the tone arm rest, the automatic record player embodying the present invention is effective to save the consumption of the valuable electric power. In addition, no adjustment heretofore required to keep the switch in timed relation to the tone arm so that the switch can be opened in response to the complete return of the tone arm to the rest position is required.

Although the present invention has fully been described in connection with the preferred embodiment thereof with reference to the accompanying drawings, it is to be noted that various changes and modifications are apparent to those skilled in the art. Such changes and modifications are to be understood as included within the true scope of the present invention unless they depart therefrom.

I claim:

1. In combination with an automatic record player including a turntable, a turntable spindle having a turntable gear, a tone arm supported for pivotal movement between a rest position and an operative position, and a drive motor for rotating the turntable in one direction, apparatus comprising:
   a gear wheel having a generally heart-shaped cam groove and a bypass groove bypassing a bypassed portion of the heart-shaped cam groove, said gear wheel being engageable with the turntable gear to be rotated thereby;
   a pivotable tone arm swinging member connected to the tone arm;
   a generally elongated drive transmitting member supported to pivot in
   (a) a plane parallel to the plane of rotation of the gear wheel between first and second positions, and
   (b) a plane perpendicular to the plane of rotation of the gear wheel between lifting and lowering positions,
   said drive transmitting member
   (c) having one end which carries a follower pin that is engaged in the heart-shaped cam groove or in the bypass groove,
   (d) having another end that is engageable with the swinging member, and
   (e) oscillating from the first position to the second position and then back to the first position during one complete rotation of the gear wheel;
   a tripping member operatively coupled to the gear wheel to engage the gear wheel with the turntable gear;
   a switching lever carried by the gear wheel and pivoting between
   (a) a first position in which the switching lever guides the follower pin away from the bypassed portion of the heart-shaped cam groove into the bypass groove, and
   (b) a second position in which the switching lever allows the follower pin to continue to move into said bypassed portion,
   the switching lever cooperating with the drive transmitting member in a manner that
   (c) when the switching lever is held in the first position and the follower pin is in the bypass groove during rotation of the gear wheel, the drive transmitting member is pivoted from the lifting position to the lowering position with said another end thereof being disengaged from the swinging member, and
   (d) when the switching lever is held in the second position and the follower pin is in the bypassed portion of the heart-shaped cam groove during rotation of the gear wheel, the drive transmitting member remains in the lifting position while the swinging member pivots; and
   a linkage means for cooperating with the swinging member to bring the switching lever into the second position when and for so long as the tone arm is held in the rest position and to bring the switching lever into the first position when the tone arm is moved from the rest position towards the operative position.

2. The apparatus claimed in claim 1, further comprising a tone arm lifting rod having one end adapted to lift the tone arm and the other end engageable with the drive transmitting member when the drive transmitting member is pivoted towards the lifting position, and wherein the heart-shaped cam groove has a depth which is shallower than that of the bypass groove.

3. The apparatus claimed in claim 1, wherein the drive transmitting member carries at said another end thereof a friction element through which said another end of the drive transmitting member is engaged with the swinging member.

4. The apparatus claimed in claim 1, wherein the linkage means comprises a first detecting lever pivotally supported at a substantially intermediate portion thereof, a second detecting lever pivotally supported at a substantially intermediate portion thereof and having one end operatively coupled to the first detecting lever and the other end having a generally X-shaped cam groove defined therein, and a guide pin rigidly mounted on the switching lever in offset relation to a pivot point about which the switching lever pivots, said guide pin being engageable into the X-shaped cam groove to bring the switching lever into the second position when the free end of the first detecting lever remote from the second detecting lever is engaged with the swinging member while the tone arm is held in the rest position.

5. The apparatus claimed in claim 1, further comprising a power control switch for controlling supply of electric power to the drive motor, a carrier plate supporting the switch, said carrier plate being pivotable between engaged and disengaged positions and normally biased to the engaged position, and a pivotally supported control lever having one end adapted to selectively close and open the switch, and wherein said swinging member has an abutment engageable with the other end of the control lever.

6. The apparatus claimed in claim 5, wherein said switch is a normally closed switch having a normally outwardly protruding actuator which opens said switch when inwardly depressed, and further comprising a manipulatable means movable between operated and inoperative positions, said manipulatable means when moved to the operated position pivoting the carrier plate away from said one end of the control lever to allow the actuator to assume its normal outwardly protruding position thereby closing the switch even if the tone arm is positioned at the rest position, means operatively coupled to the manipulatable means for causing the tripping member to bring the gear wheel into engagement with the turntable gear independently of the pivotal movement of the tone arm, and means for locking the manipulatable means in the engaged position.

7. The apparatus claimed in claim 6, wherein said locking means comprises a cam body formed on the gear wheel and a locking lever pivotable between locking and releasing positions and having one end riding on the cam body and sliding thereon and the other end operatively coupled to the manipulatable means, said cam body being so shaped that, shortly after the gear wheel is rotated from its initial position, said locking lever is pivoted in one direction to lock the manipulatable means in the engaged position, and, shortly before the completion of 360° rotation of the gear wheel, said locking lever is pivoted in a direction counter to said direction to release the manipulatable means from the engaged position back towards the disengaged position.

8. The apparatus claimed in claim 1, 2, 3, 4, 5, 6 or 7, further comprising a record size selector for regulating the angle of rotation of the tone arm according to the size of the record to be played.

* * * * *